H. W. GATES.
GARDEN HOE.
APPLICATION FILED OCT. 13, 1916.
1,235,790.
Patented Aug. 7, 1917.
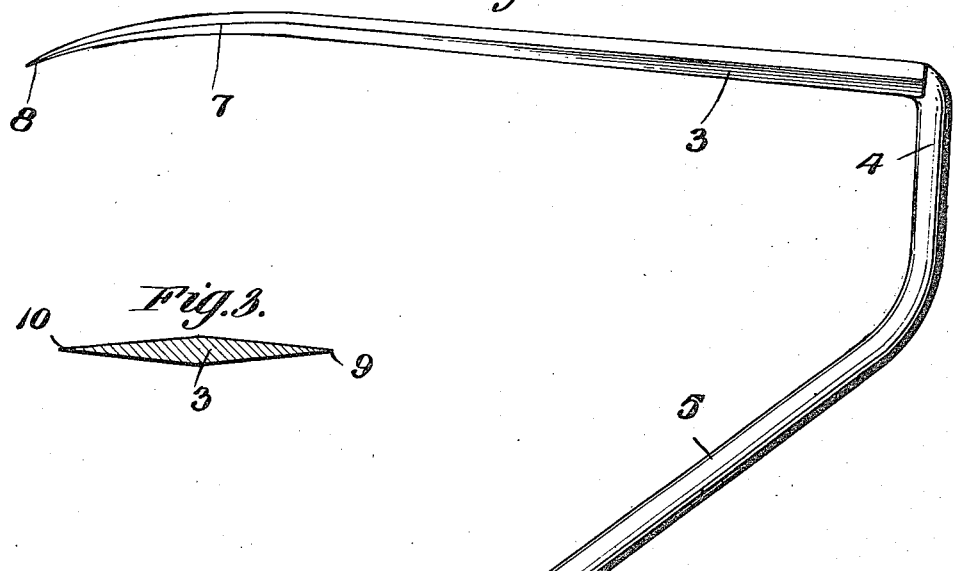
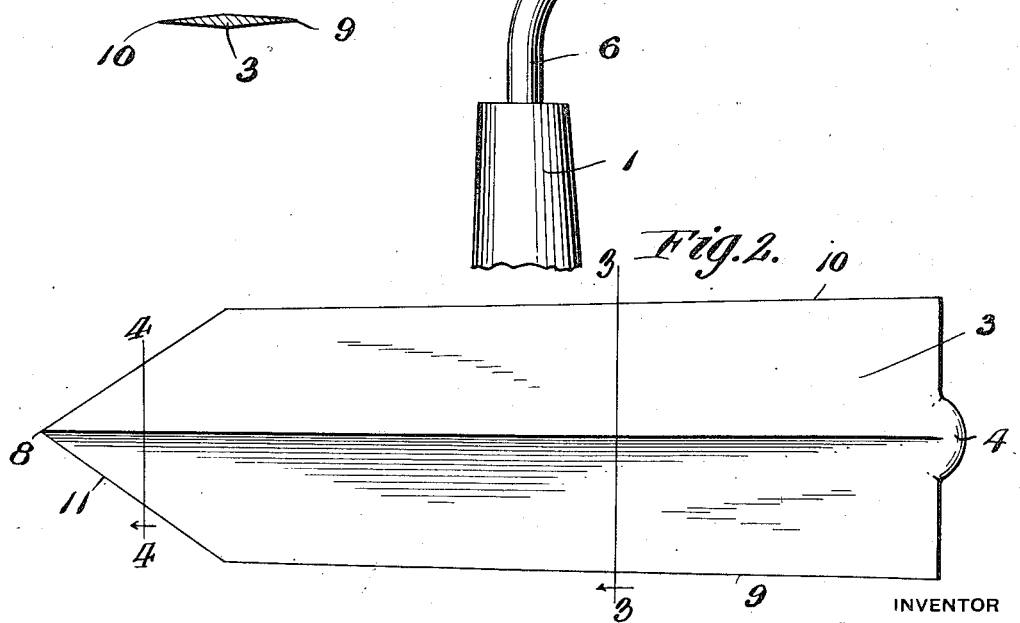
WITNESSES
Guy M. Spring
Wm. Webster Downing
INVENTOR
Henrie W. Gates.
BY Richard Owen,
ATTORNEY ically designated 3, said blade having a re-

UNITED STATES PATENT OFFICE.

HENRIE W. GATES, OF OLALLA, WASHINGTON.

GARDEN-HOE.

1,235,790.     Specification of Letters Patent.     Patented Aug. 7, 1917.

Application filed October 13, 1916. Serial No. 125,447.

*To all whom it may concern:*

Be it known that I, HENRIE W. GATES, a citizen of the United States, residing at Olalla, in the county of Kitsap and State of Washington, have invented certain new and useful Improvements in Garden-Hoes, of which the following is a specification.

My invention relates broadly to a hoe, and more particularly has reference to a garden hoe.

As the primary object, it may be stated, that the present invention has to provide an improved form of hoe constructed so that the side edges and outer end may be conveniently and expeditiously used for weeding vegetables.

More particularly, the present invention includes the provision of a blade provided with a gradually tapered point which facilitates an efficient entrance of the blade to the ground thus providing a hoe that can be readily operated.

Among the other aims and objects of the invention resides in the provision of a device of the character mentioned, that is simple in construction, strong and durable, that is practical for use in the ground whether it be soft, hard, stony, weedy, etc., and incidentally is in every respect a cultivating weeding hoe.

Other objects, as well as the nature, characteristic features and scope of my invention will be more readily understood from the following description taken in connection with the accompanying drawings and pointed out in the claim, forming a part of this specification.

A preferred embodiment of the present invention is clearly illustrated in the accompanying drawings, in which:—

Figure 1 is a side elevation of my invention.

Fig. 2 is a top plan.

Fig. 3 is a transverse section taken on line 3—3 of Fig. 2 in the direction in which the arrow points.

Fig. 4 is a transverse section taken on line 4—4 of Fig. 2 in the direction in which the arrow points.

Similar characters of reference may be employed in all of the above described views, to indicate corresponding parts.

Referring now, more particularly, to the accompanying drawings I provide a handle 1 which carries my improved blade generally designated 3, said blade having a reduced shank 4 extending from the inner end thereof and the shank is offset as illustrated by the numeral 5 while the free end 6 thereof is anchored in the end of the handle as indicated in Fig. 1, the blade 3 being arranged in a plane at right angles to the longitudinal axis and the end of the shank 6 as well as the handle 1.

In the present instance the blade consists of an elongated tapering body which is curved as illustrated by the numeral 7 adjacent its outer end being finally tapered to a point 8 at the outer end. This blade may be and preferably is of a diamond shape in cross section as illustrated in Figs. 3 and 4 so as to consequently provide cutting edges 9 and 10 on the longitudinal edges thereof. These longitudinal cutting edges 9 and 10 converge toward the outer pointed end 8 while the extreme outer end has the longitudinal edges beveled as indicated by the numeral 11 to the point 8. As is apparent the outer end of this blade is tapered to points in its three directions, namely, breadth, length, and thickness and because of the peculiarly constructed yet novel end, when in use, the same easily enters the ground and can be used with more rapidity than the usual or conventional type of hoe. Incidentally the cutting edges 9 and 10 can be conveniently used in an obvious manner.

It is thought from the above that a detailed description of the operation is unnecessary and likewise it is thought that the advantages of the invention when in use will be readily appreciated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claim is intended to cover all of the generic and specific features of the invention herein described and all statements of the scope of the invention, which, as a matter of language, might be said to fall therebetween.

Having described my invention, what I claim as new and desire to secure by Letters Patent is:—

A hoe blade comprising an elongated body having its major portion substantially straight and slightly curved adjacent one of its ends, the front and rear faces of the blade being tapered toward the extremity of said curved end and beveled from its longitudinal center toward the side edges thereof to form the blade of a substantially diamond shape cross section throughout its length, the side edges of the extremity of said curved end being beveled toward each other to a point.

In testimony whereof I affix my signature in presence of two witnesses.

HENRIE W. GATES.

Witnesses:
 CLYDE H. GATES,
 JOHN SHATTUCK.